US012603025B2

(12) United States Patent
Feng

(10) Patent No.: US 12,603,025 B2
(45) Date of Patent: Apr. 14, 2026

(54) DISPLAY APPARATUS, CONTROL METHOD, DISPLAY DEVICE AND COMPUTER STORAGE MEDIUM

(71) Applicant: BOE Technology Group Co., Ltd., Beijing (CN)

(72) Inventor: Ke Feng, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 145 days.

(21) Appl. No.: 18/696,967

(22) PCT Filed: Jul. 28, 2023

(86) PCT No.: PCT/CN2023/110019
§ 371 (c)(1),
(2) Date: Mar. 28, 2024

(87) PCT Pub. No.: WO2024/041310
PCT Pub. Date: Feb. 29, 2024

(65) Prior Publication Data

US 2024/0404442 A1 Dec. 5, 2024

(30) Foreign Application Priority Data

Aug. 24, 2022 (CN) ......................... 202211020735.1

(51) Int. Cl.
*G09G 3/00* (2006.01)

(52) U.S. Cl.
CPC .................................... *G09G 3/035* (2020.08)

(58) Field of Classification Search
CPC ............ G09G 3/035; G09F 9/30; G09F 9/301
USPC .......... 345/156, 501, 592; 600/585; 455/566
See application file for complete search history.

(56) References Cited

U.S. PATENT DOCUMENTS

2012/0329528 A1* 12/2012 Song .................. H04M 1/0268 455/566
2014/0015745 A1* 1/2014 Chae ..................... G06F 1/1652 345/156
2015/0169006 A1* 6/2015 Chong .................. G06F 1/1652 345/1.3
2015/0301672 A1* 10/2015 Kim ....................... G09G 3/035 345/156
2017/0023971 A1* 1/2017 Lee .......................... G02C 5/20
(Continued)

FOREIGN PATENT DOCUMENTS

CN 107980156 A 5/2018
CN 103365594 B 7/2018
(Continued)

OTHER PUBLICATIONS

CN202211020735.1 Notification to grant patent right for invention dated Sep. 28, 2023.

*Primary Examiner* — Prabodh M Dharia
(74) *Attorney, Agent, or Firm* — IPro, PLLC

(57) ABSTRACT

The present disclosure provides a display apparatus. The display apparatus includes a reel, a flexible display panel, a detection assembly, and a plurality of flex sensors. The plurality of flex sensors are disposed on the flexible display panel and arranged along a winding direction of the flexible display panel. The flex sensors are configured to detect a change in a bending degree of the flexible display panel and output corresponding voltages according to the bending degree.

14 Claims, 7 Drawing Sheets

(56) References Cited

U.S. PATENT DOCUMENTS

| | | | | |
|---|---|---|---|---|
| 2019/0113952 | A1 | 4/2019 | Ahmed et al. | |
| 2022/0138993 | A1* | 5/2022 | Kwatra | G06T 11/60 345/173 |
| 2022/0171436 | A1* | 6/2022 | He | F16M 11/18 |
| 2022/0280298 | A1* | 9/2022 | Schwarcz | A61F 2/2433 |
| 2023/0014068 | A1* | 1/2023 | Ayoub | G06F 3/017 |
| 2023/0181881 | A1* | 6/2023 | Sharma | A61M 25/0147 600/585 |
| 2023/0298245 | A1* | 9/2023 | Yu | G06T 3/40 345/592 |

FOREIGN PATENT DOCUMENTS

| | | | |
|---|---|---|---|
| CN | 109427816 | A | 3/2019 |
| CN | 110277433 | A | 9/2019 |
| CN | 110379309 | A | 10/2019 |
| CN | 111210725 | A | 5/2020 |
| CN | 111583789 | A | 8/2020 |
| CN | 112689824 | A | 4/2021 |
| CN | 112771467 | A | 5/2021 |
| CN | 113261109 | A | 8/2021 |
| CN | 113593411 | A | 11/2021 |
| CN | 114205435 | A | 3/2022 |
| CN | 115273675 | A | 11/2022 |
| WO | 2021249049 | A1 | 12/2021 |

* cited by examiner

DISPLAY APPARATUS, CONTROL METHOD, DISPLAY DEVICE AND COMPUTER STORAGE MEDIUM

CROSS-REFERENCE TO RELATED APPLICATION

This application is a U.S. national stage of international application No. PCT/CN2023/110019, filed on Jul. 28, 2023, which claims priority to Chinese patent application No. 202211020735.1, filed on Aug. 24, 2022, and entitled “DISPLAY APPARATUS, CONTROL METHOD, DISPLAY APPARATUS, AND COMPUTER STORAGE MEDIUM,” the disclosures of which are herein incorporated by reference in their entireties.

TECHNICAL FIELD

The present disclosure relates to the field of display technologies, and in particular, to a display apparatus, a control method, a display device, and a computer storage medium.

BACKGROUND

Currently, a display device can use a flexible display panel as its display screen, and the flexible display panel has the advantages of being deformable, bendable, and more flexible compared to a conventional display panel.

SUMMARY

Embodiments of the present disclosure provide a display apparatus, a control method, a display device, and a computer storage medium. The technical solutions include the following.

According to some embodiments of the present disclosure, a display apparatus is provided. The display apparatus includes:

- a reel, a flexible display panel, a detection assembly, and a plurality of flex sensors; wherein
- at least part of the flexible display panel is wound on the reel;
- the plurality of flex sensors are connected in series and disposed on the flexible display panel, the plurality of flex sensors are arranged along a winding direction of the flexible display panel, and a resistance value of the flex sensor is positively correlated with a bending degree of the flex sensor; and
- the detection assembly is electrically connected to the plurality of flex sensors respectively to detect voltages of the flex sensors.

In some embodiments, the display apparatus further includes: a fixed housing, a telescopic structure, a support member, and a tension member, wherein one end of the telescopic structure is fixedly connected to the fixed housing, another end of the telescopic structure is fixedly connected to the support member, and the support member is movably connected to the reel; and

- the flexible display panel includes a flat display portion and a slidable and rollable display portion that are connected to each other, wherein one edge of the flat display portion is fixedly connected to one edge of the slidable and rollable display portion, the flat display portion is fixedly connected to the fixed housing, the slidable and rollable display portion is at least partially wound on the reel, another edge of the slidable and rollable display portion is fixedly connected to one end of the tension member, and another end of the tension member is fixedly connected to the fixed housing.

In some embodiments, the plurality of flex sensors are disposed in the slidable and rollable display portion, and a number of the flex sensors and a first width of the slidable and rollable display portion satisfy a first formula:

$$n = S / L_1;$$

- wherein n represents the number of the flex sensors, S represents the first width of the slidable and rollable display portion, the first width being a width of the slidable and rollable display portion in a direction perpendicular to a length direction of the reel in a state where the flexible display panel is contracted, and $L_1$ represents a length of the flex sensor in an arrangement direction of the plurality of flex sensors.

In some embodiments, the plurality of flex sensors have a same structure, shape, and size.

In some embodiments, the flex sensor includes a metal pattern, and the flex sensor is in a shape of a strip or a winding line.

In some embodiments, the flexible display panel includes agate line and a data line:

- wherein the flex sensor is disposed in a same layer as the gate line, or the flex sensor is disposed in a same layer as the data line.

In some embodiments, the display device further includes: a control assembly and a drive assembly, wherein the control assembly is electrically connected to the detection assembly and the drive assembly respectively, and the drive assembly is configured to drive the reel to rotate; and

- the control assembly is configured to receive voltages of the plurality of flex sensors acquired by the detection assembly and control the rotation or stopping of the reel by determining a sliding distance of the flexible display panel based on the voltages, the sliding distance being a distance by which the reel drives the flexible display panel to move.

According to some embodiments of the present disclosure, a method for controlling a display apparatus is provided. The method is applicable to the above display apparatus, and the method includes:

- acquiring voltages of a plurality of flex sensors connected in series in the display apparatus, wherein the plurality of flex sensors have, along a direction away from a reel, a plurality of arrangement serial numbers from small to large in a state where a flexible display panel is contracted;
- comparing the voltages of the plurality of flex sensors;
- acquiring an amount of voltage change and an arrangement serial number of a target flex sensor in response to a change in a voltage of at least one flex sensor of the plurality of flex sensors, the target flex sensor being a flex sensor with a largest arrangement serial number among the at least one flex sensor; and
- determining a sliding distance of the flexible display panel based on the amount of voltage change and the arrangement serial number, the sliding distance being a distance by which a reel drives the flexible display panel to move.

In some embodiments, determining the sliding distance of the flexible display panel based on the amount of voltage change and the arrangement serial number includes:

acquiring a bending angle of the target flex sensor based on the amount of voltage change and a correspondence between the amount of voltage change and a bending angle of the flex sensor;

acquiring a bending distance of the target flex sensor based on the bending angle; and determining the sliding distance based on a second formula:

$$D=(m-1)\times L_1+L_0;$$

wherein D represents the sliding distance, m represents an arrangement serial number of a target flex sensor, $L_1$ represents a length of the flex sensor in an arrangement direction of the plurality of flex sensors, and $L_0$ represents the bending distance of the target flex sensor.

In some embodiments, the length of the flex sensor in the arrangement direction of the plurality of flex sensors is one-half of a circumference of the reel; and acquiring the bending distance of the target flex sensor based on the bending angle includes:

determining the bending distance based on a third formula:

$$L_0=(\alpha_m/180°)\times L_1;$$

wherein the $\alpha_m$ represents the bending angle of the target flex sensor.

In some embodiments, the voltages of the plurality of flex sensors are acquired in real-time or according to a predetermined frequency.

In some embodiments, the predetermined frequency is greater than a refresh frequency of the flexible display panel.

According to some embodiments of the present disclosure, a display device is provided. The display device includes a display apparatus, a processor, and a memory, wherein the display apparatus is the above display apparatus, and the memory stores at least one instruction, at least one program, a code set, or an instruction set, the at least one instruction, the at least one program, the code set, or the instruction set, when loaded and executed by the processor, causing the processor to perform the above method for controlling the display apparatus.

According to some embodiments of the present disclosure, a non-transitory computer storage medium is provided. The computer storage medium stores at least one instruction, at least one program, a code set, or an instruction set, wherein the at least one instruction, the at least one program, the code set, or the instruction set, when loaded and executed by a processor, causes the processor to perform the above method for controlling a display apparatus.

According to some embodiments of the present disclosure, a computer program product or computer program is provided. The computer program product or computer program includes computer instructions that are stored in a computer-readable storage medium. The computer instructions, when loaded from the computer-readable storage medium and run by a processor of a computer device, cause the computer device to perform the above method for controlling a display apparatus.

BRIEF DESCRIPTION OF DRAWINGS

In order to more clearly illustrate the technical solutions provided by the embodiments of the present disclosure, the accompanying drawings to be used in the description of the embodiments are briefly introduced hereinafter, and it is obvious that the accompanying drawings described hereinafter are merely some of the embodiments of the present disclosure. For a person of ordinary skill in the art, other accompanying drawings can be obtained based on these drawings without creative labor.

By means of the above accompanying drawings, some specific embodiments of the present disclosure are shown and described in detail hereinafter. These accompanying drawings and textual descriptions are not intended to limit the scope of the concept of the present disclosure in any way, but rather to illustrate the concepts of the present application for those skilled in the art by reference to particular embodiments.

DETAILED DESCRIPTION

In order to make the objects, technical solutions, and advantages of the present application clearer, the embodiments of the present application are described in detail hereinafter in conjunction with the accompanying drawings.

There is a display apparatus in the related art in which the flexible display panel can be unfolded to a side of the display apparatus or rolled up by sliding the flexible display panel, so that the size of the flexible display panel increases or decreases in the sliding direction, thereby achieving a size adjustment function of a display surface of the display apparatus.

The above display apparatus includes a housing, a reel, the flexible display panel, and a Hall sensor, wherein the flexible display panel disposed in the housing can be moved to the side on which the display surface of the display device is located by the cooperation of the reel and the flexible display panel in the sliding process, which can increase the size of the display surface of the display apparatus. That is, two states of unfolding and contraction of the flexible display panel can be achieved by sliding the flexible display panel.

Figure 1:
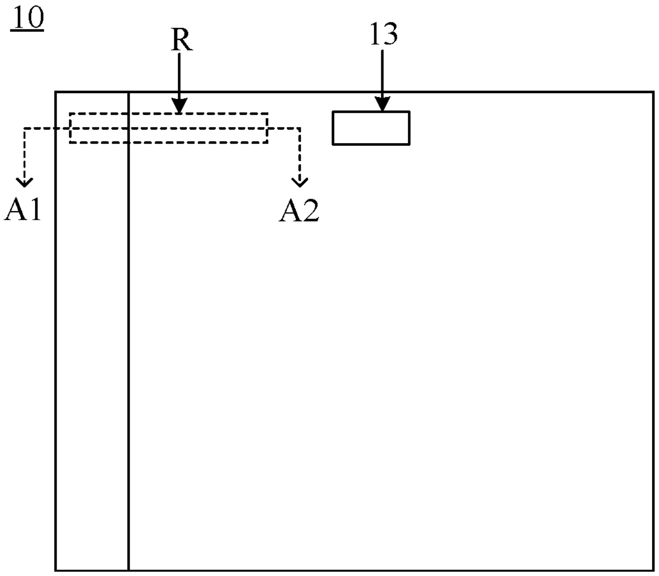
FIG. 1 is a structural schematic diagram of a display apparatus according to the embodiments of the present disclosure.
Figure 2:
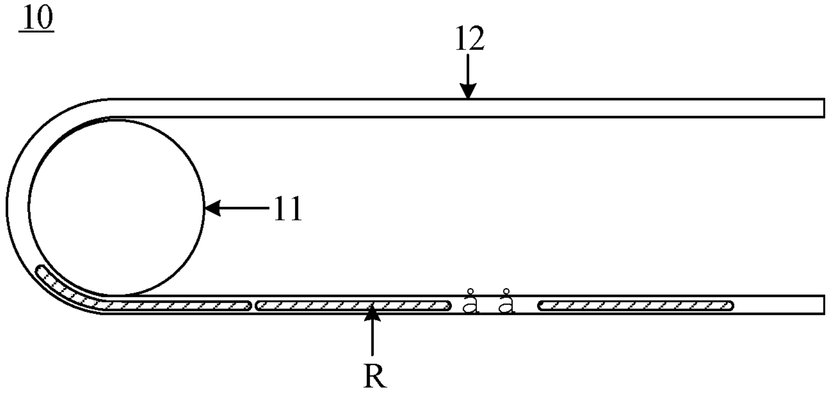
FIG. 2 is a schematic diagram of a cross-sectional structure of the display apparatus shown in FIG. 1 along A1-A2.

FIG. 1 is a structural schematic diagram of a display apparatus 10 according to the embodiments of the present disclosure, and FIG. 2 is a schematic diagram of a cross-sectional structure of the display apparatus shown in FIG. 1 along A1-A2, reference is made to FIG. 1 and FIG. 2. In some embodiments, the display apparatus 10 includes: a reel 11, a flexible display panel 12, a detection assembly 13, and a plurality of flex sensors R.

In some embodiments, at least part of the flexible display panel 12 is wound on the reel 11, and as shown in FIG. 2, in the case that the reel 11 drives the flexible display panel 12 to be unfolded or rolled up, a bending phenomenon is occurred in a region where the flexible display panel 12 is adhered to the reel 11. That is, there are a bending region and an unbending region on the flexible display panel 12.

The plurality of flex sensors R are connected in series and disposed on the flexible display panel 12, the plurality of flex sensors R are arranged along a winding direction of the flexible display panel 12, and a resistance value of the flex sensor R is positively correlated with a bending degree of the flex sensor R. That is, in some embodiments, the flexible display panel 12 is provided with a plurality of flex sensors R, and the plurality of flex sensors R are distributed at a plurality of positions of the flexible display panel 12 for detecting the bending degrees of the flexible display panel 12 at various positions. In the case that the flex sensor R is located in the bending region of the flexible display panel 12, the flex sensor R is also capable of bending with the flexible display panel 12. Because the resistance value of the flex sensor R changes with the bending degree of the flex sensor R, in the case that a plurality of flex sensors R are connected in series, at least one of the flex sensors R that is bent is capable of outputting an output signal related to the bending degree, wherein the value of the output signal of the flex sensor R varies with the bending degree of the flex sensor R.

Figure 3:
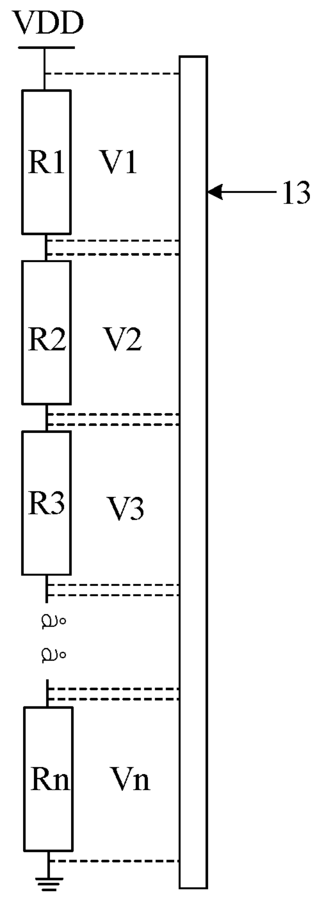
FIG. 3 is a schematic diagram of a connection structure of a flex sensor according to the embodiments of the present disclosure.

FIG. 3 is a schematic diagram of a connection structure of a flex sensor according to the embodiments of the present disclosure, wherein the detection assembly 13 is electrically connected to a plurality of flex sensors (in some embodiments, the plurality of flex sensors includes R1, R2, R3, . . . and Rn), respectively, to detect voltages of the plurality of flex sensors (R1, R2, R3, . . . and Rn), the voltages being the output signals of the plurality of flex sensors (R1, R2, R3, . . . and Rn). In some embodiments, the detection assembly 13 is configured to detect a voltage (V1, V2, V3, . . . and Vn) corresponding to each of the flex sensors (R1, R2, R3, . . . and Rn), and acquire, the bending state and the bending degree of the corresponding flex sensor R based on the voltage, wherein the bending state includes two states of bending and unbending. Therefore, the bending state of the flexible display panel at the position where the flex sensor R is disposed is acquired.

In this way, an unfolding size or a contraction size of the flexible display panel in the process of unfolding or contracting can be accurately acquired. In some embodiments, it can be determined that the flexible display panel is unfolded to one-fourth, one-third, or one-half of a maximum size, etc., during the unfolding process, wherein the maximum size is a maximum size of a portion of the flexible display panel that can be unfolded.

In summary, the embodiments of the present disclosure provide a display apparatus including a reel, a flexible display panel, a detection assembly, and a plurality of flex sensors. The plurality of flex sensors are disposed on the flexible display panel and arranged along a winding direction of the flexible display panel. The flex sensors are configured to detect a change in the bending degree of the flexible display panel and output corresponding voltages according to the bending degree. In this way, an unfolding size or a contraction size of the flexible display panel in an unfolding process or a contraction process can be acquired by detecting bending states at multiple positions of the flexible display panel through the plurality of flex sensors, therefore the state of the flexible display panel is accurately detected, which can solve the problem of the poor accuracy of the state detection results of the flexible display panel in the related art, and achieve the effect of improving the accuracy of the state detection results of the flexible display panel.

In the display apparatus of the related art, the reel itself is capable of rotating, and the flexible display panel can be unfolded or rolled up under the drive of the reel to enable the display device to have two states: an unfolded state and a contracted state, so as to achieve a function of adjusting the size of a display surface of the display device. The Hall sensor is disposed at an end point of the flexible display panel to detect the state of the flexible display panel. The Hall sensor detects the sliding position of the flexible display panel in the case of the flexible display panel being sliding, wherein the Hall sensor can also be a sensor for detecting positions such as an infrared distance detection sensor. Because the Hall sensor is disposed at an end point of the flexible display panel, only the position of the flexible display panel at the starting point of sliding and the position at the endpoint of sliding can be detected. That is, the detect sensor in the related art is unable to acquire the state of the flexible display panel in the case that the flexible display panel is sliding between the sliding starting point and the sliding endpoint, resulting in the state detection results of the flexible display panel of the above-described display apparatus being insufficiently accurate.

In the embodiments of the present disclosure, a plurality of flex sensors are integrated into the flexible display panel, so that the bending states of the flexible display panel at a plurality of positions can be detected by the flex sensors, and the state of the flexible display panel in the case that the flexible display panel is sliding between the sliding starting point and the sliding endpoint can then be accurately acquired, i.e., the unfolding size or the contraction size of the flexible display panel in the process of unfolding or contracting can be determined. Therefore, the plurality of flex sensors and the detection assembly in the embodiments of the present disclosure are not only capable of detecting the state of the flexible display panel in the case of the flexible display panel sliding between the sliding starting and the sliding endpoint, but also capable of detecting the state of the flexible display panel more accurately during the sliding process.

Figure 4:
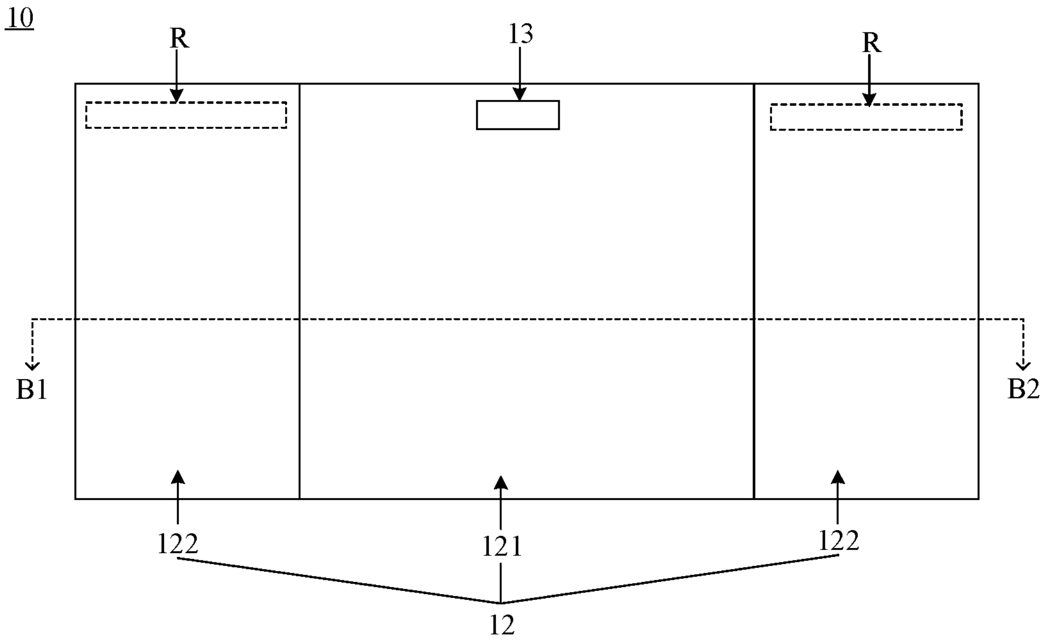
FIG. 4 is a structural schematic diagram of another display apparatus according to the embodiments of the present disclosure.
Figure 5:
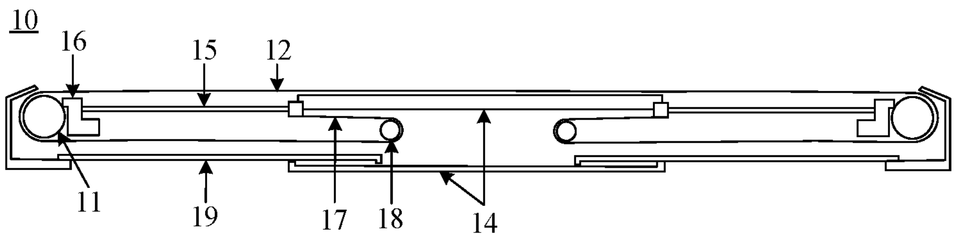
FIG. 5 is a schematic diagram of a cross-sectional structure of the display apparatus shown in FIG. 4 along B1-B2.

FIG. 4 is a structural schematic diagram of another display apparatus 10 according to the embodiments of the present disclosure, FIG. 5 is a schematic diagram of a cross-sectional structure of the display apparatus 10 shown in FIG. 4 along B1-B2, reference is made to FIG. 4 and FIG. 5. In some embodiments, the display apparatus 10 further includes: a fixed housing 14, a telescopic structure 15, a support member 16, and a tension member 17, wherein one end of the telescopic structure 15 is fixedly connected to the fixed housing 14, another end of the telescopic structure 15 is fixedly connected to the support member 16, and the support member 16 is movably connected to the reel 11. In some embodiments, the display apparatus 10 further includes a sliding housing 19. In some embodiments, the sliding housing 19 is movably connected to the fixed housing 14, and both ends of the support member 16 are fixedly connected to the sliding housing 19.

The flexible display panel 12 includes a flat display portion 121 and a slidable and rollable display portion 122 that are connected to each other. In some embodiments, the number of the slidable and rollable display portions 122 is one, two, or more, which is not limited in the embodiments of the present disclosure. One edge of the flat display portion 121 is fixedly connected to one edge of the slidable and rollable display portion 122, the flat display portion 121 is fixedly connected to the fixed housing 14, and the slidable and rollable display portion 122 is at least partially wound on the reel 11.

In some embodiments, the display apparatus 10 further includes a guide shaft 18. In some embodiments, the guide shaft 18 is movably connected to the telescopic structure 15. In some embodiments, the guide shaft 18 is rotationally connected to the sliding housing 19. Another edge of the slidable and rollable display portion 122 is fixedly connected to one end of the tension member 17, another end of the tension member 17 is fixedly connected to the fixed housing 14, and the middle portion of the tension member 17 is wound on the guide shaft 18 and slidably connected to the guide shaft 18. A length direction of the guide shaft 18 is parallel to a length direction of the reel 11. At the same time, in some embodiments, the tension member 17 is elastic to some extent, and applies a specific tensile force on the flexible display panel 12, so as to keep the flatness of the flexible display panel 12, and to avoid wrinkles of the flexible display panel 12 due to undue slackness.

FIG. 4 is a structural schematic diagram of a display apparatus 10 in an unfolded state, wherein upon the telescopic structure 15 sliding for a specific distance relative to the fixed housing 14 along a first direction, the telescopic structure 15 is capable of driving the support member 16 to move in a direction away from the fixed housing 14. In turn, the support member 16 drives the reel 11 to move along a direction away from the fixed housing 14 to enable the slidable and rollable display portion 122 of the flexible display panel 12 to slide and roll out from the interior of the fixed housing 14, and thus, the size of the display surface of the display apparatus 10 is increased. The first direction is the direction in which the telescopic structure 15 is moved relative to the fixed housing 14, i.e., the direction perpendicular to the length direction of the reel 11. Therein, in the case that the display apparatus 10 is in the unfolded state, the display surface of the flat display portion 121 and the display surface of the slidable and rollable display portion 122 are in a same plane.

Figure 6:
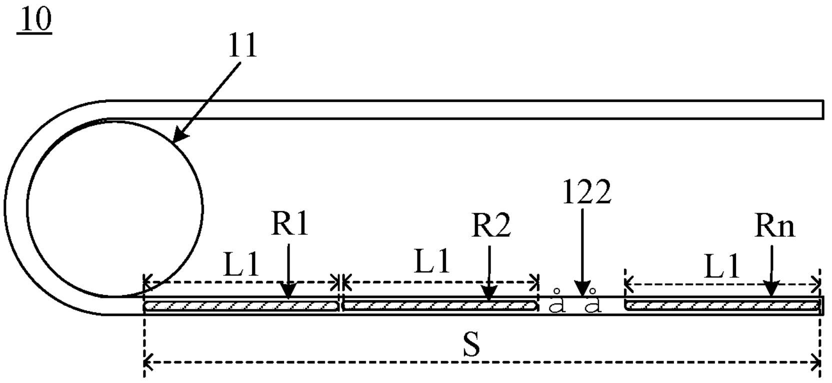
FIG. 6 is a structural schematic diagram of another display apparatus according to the embodiments of the present disclosure.

In some embodiments, the plurality of flex sensors R are disposed in the slidable and rollable display portion 122, and no flex sensor R is provided in the flat display portion 121, which simplifies the manufacturing process of the flexible display panel 12. FIG. 6 is a structural schematic diagram of another display apparatus according to the embodiments of the present disclosure, reference is made to FIG. 6. FIG. 6 is a structural schematic diagram of the display apparatus 10 in a contracted state, i.e., the slidable and rollable display portion 122 of the flexible display panel 12 is inside the fixed housing 14, and at this time, the slidable and rollable display portion 122 of the flexible display panel 12 does not display a picture. In some embodiments, the flexible display panel 12 further includes a connecting portion that connects the flat display portion 121 and the slidable and rollable display portion 122, and the connecting portion is bonded to the reel 11 in the case that the display apparatus 10 is in the contracted state.

In some embodiments, a number of the plurality of flex sensors R and a first width of the slidable and rollable display portion 122 satisfy a first formula:

$$n = S / L_1;$$

wherein n represents the number of the plurality of flex sensors R, S represents the first width of the slidable and rollable display portion 122, the first width being a width of the slidable and rollable display portion 122 in a direction perpendicular to the length direction of the reel 11 in the case of the flexible display panel 12 being in a contracted state, and $L_1$ represents the length of the flex sensor R in the arrangement direction of the plurality of flex sensors R. In this way, all of the regions capable of bending of the flexible display panel 12 are provided with the flex sensors R, and the bending state of the slidable and rollable display portion of the flexible display panel 12 can be accurately detected.

In some embodiments, the plurality of flex sensors R have a same structure, shape, and size. By setting the device characteristics of the multiple flex sensors R the same, the accuracy of the measurement of the bending state is improved. In the case that the display apparatus 10 is in the bending state, as shown in FIG. 6, R1, R2, R3, . . . and Rn denote the plurality of flex sensors R, and V1, V2, V3, . . . and Vn are the voltages of the plurality of flex sensors R measured by the detection assembly 13. In FIG. 5, the plurality of flex sensors R are in an unbending state, i.e., the bending angle is 0°, at which time the voltages of the plurality of flex sensors R are the same, V1=V2=V3 . . . =Vn.

Figure 7:
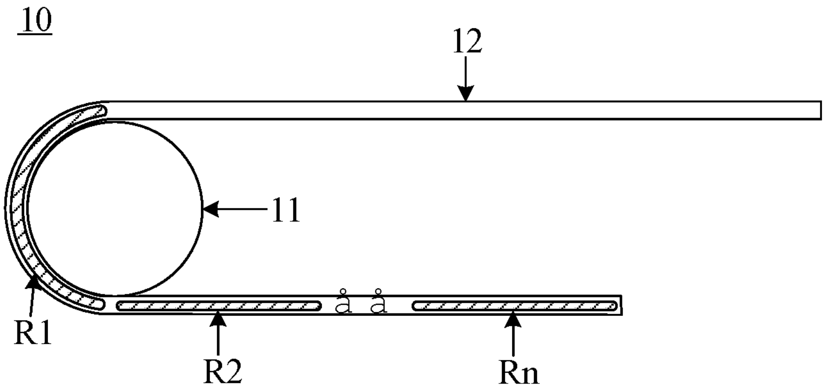
FIG. 7 is a schematic diagram of a bending structure of a flex sensor according to the embodiments of the present disclosure.

The voltage outputted by each of the flex sensors R disposed in the slidable and rollable display portion 122 is positively correlated with the bending degree of the flex sensor R that is in the bending state. In some embodiments, FIG. 7 is a schematic diagram of a bending structure of a flex sensor R according to the embodiments of the present disclosure, reference is made to FIG. 7. In the case that the flexible display panel 12 is bent in the winding direction, the flex sensors R disposed in the bending region are bent synchronously, and at this time, the voltage outputted by the flex sensor R is changed. The change degree of the voltage of the flex sensor R indicates the bending degree of the flex sensor R, thereby indicating the bending position and the bending degree of the flexible display panel 12. In some embodiments, as shown in FIG. 7, during the sliding process of the entire slidable and rollable apparatus, in the case that the flex sensor R1 is completely at the slidable and rollable reel, the bending degree of the flex sensor R1 is maximum, the bending angle of the flex sensor R1 is 180°, and at this time, the voltage output by the flex sensor R1 is also maximum, i.e., V1=Vmax.

In some embodiments, the flex sensor includes a metal pattern, and the flex sensor is in a shape of a strip or a winding line. The winding line-shaped flex sensor can increase the resistance value of the flex sensor, so that the detection assembly can more accurately acquire the voltage output by the flex sensor. Further, the flex sensor has a width of 3 micrometers to 15 micrometers in a second direction, the second direction being perpendicular to the extension direction of the flex sensor.

In some embodiments, the flexible display panel further includes a gate line (Gate) and a data line (Data), the flex sensor is disposed in the same layer as the gate line, or, the flex sensor is disposed in the same layer as the data line. In this way, the flex sensor is integrated into the display panel, and the space occupied by the flex sensor is reduced compared to sensors such as Hall sensors in the related art.

In some embodiments, the display apparatus further includes: a control assembly and a drive assembly, the control assembly being electrically connected to the detection assembly and the drive assembly, respectively, and the drive assembly being configured to drive the reel to rotate. In some embodiments, the control assembly is configured to receive voltages of a plurality of flex sensors acquired by the detection assembly, and control the rotation or stopping of the reel by determining a sliding distance of the flexible display panel based on the voltages, the sliding distance being a distance by which the reel drives the flexible display panel to move. Based on the sliding distance, an unfolding size or a contraction size of the flexible display panel during the unfolding or contraction process is determined. In some embodiments of the present disclosure, a database is established through practical testing, which includes a one-to-one correspondence between the voltage and the bending angle. During the use of the display apparatus, in the case that the voltage is detected by the detection assembly, a corresponding bending angle is directly acquired by searching the database, and then based on the bending angle and the position of the flex sensor, the bending state and the bending position of the flexible display panel is determined. In this way, stepless control of the flexible display panel is achieved, so that the flexible display panel can be stopped at an arbitrary position during the process of unfolding or contracting, and thus the flexible display panel is made to have display surfaces of multiple sizes.

In summary, the embodiments of the present disclosure provide a display apparatus including a reel, a flexible display panel, a detection assembly, and a plurality of flex sensors. The plurality of flex sensors are disposed on the flexible display panel and arranged along a winding direction of the flexible display panel. The flex sensors are configured to detect a change in the bending degree of the flexible display panel and output corresponding voltages according to the bending degree. In this way, an unfolding size or a contraction size of the flexible display panel in an unfolding process or a contraction process can be acquired by detecting bending states at multiple positions of the flexible display panel through the plurality of flex sensors, therefore the state of the flexible display panel is accurately detected, which can solve the problem of the poor accuracy of the state detection results of the flexible display panel in the related art, and achieve the effect of improving the accuracy of the state detection results of the flexible display panel.

Figure 8:
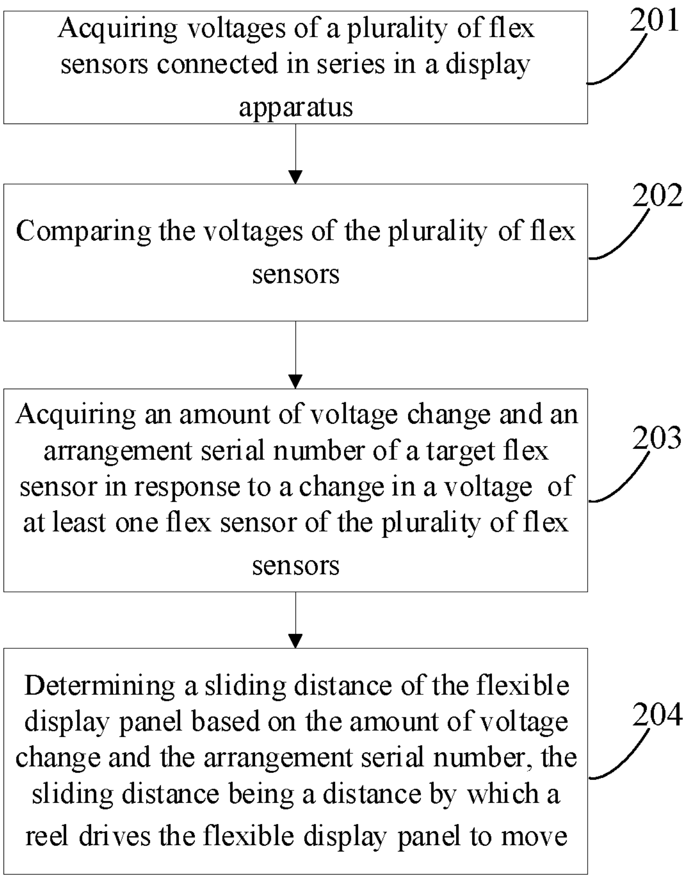
FIG. 8 is a flowchart of a method for controlling a display apparatus according to the embodiments of the present disclosure.

FIG. 8 is a flowchart of a method for controlling a display apparatus according to the embodiments of the present disclosure. In some embodiments, the method is applicable to the display apparatus in any of the above embodiments. The method includes the following processes.

In process 201, voltages of a plurality of flex sensors connected in series in the display device are acquired.

The plurality of flex sensors have, along a direction away from the reel, a plurality of arrangement serial numbers from small to large in a state where the flexible display panel is contracted.

In process 202, the voltages of the plurality of flex sensors are compared.

In process 203, in response to a change in a voltage of at least one flex sensor of the plurality of flex sensors, an amount of voltage change and the arrangement serial number of the target flex sensor are acquired.

The target flex sensor is a flex sensor with a largest arrangement serial number among the at least one flex sensor.

In process 204, a sliding distance of the flexible display panel is determined based on the amount of voltage change and the arrangement serial number, the sliding distance being a distance by which a reel drives the flexible display panel to move.

In summary, a method for controlling a display apparatus is provided by the embodiments of the present disclosure, the display apparatus including a reel, a flexible display panel, a detection assembly, and a plurality of flex sensors. The plurality of flex sensors are disposed on the flexible display panel and arranged along a winding direction of the flexible display panel. The flex sensors are configured to detect a change in the bending degree of the flexible display panel and output corresponding voltages according to the bending degree. In this way, an unfolding size or a contraction size of the flexible display panel in an unfolding process or a contraction process can be acquired by detecting bending states at multiple positions of the flexible display panel through the plurality of flex sensors, therefore the state of the flexible display panel is accurately detected, which can solve the problem of the poor accuracy of the state detection results of the flexible display panel in the related art, and achieve the effect of improving the accuracy of the state detection results of the flexible display panel.

Figure 9:
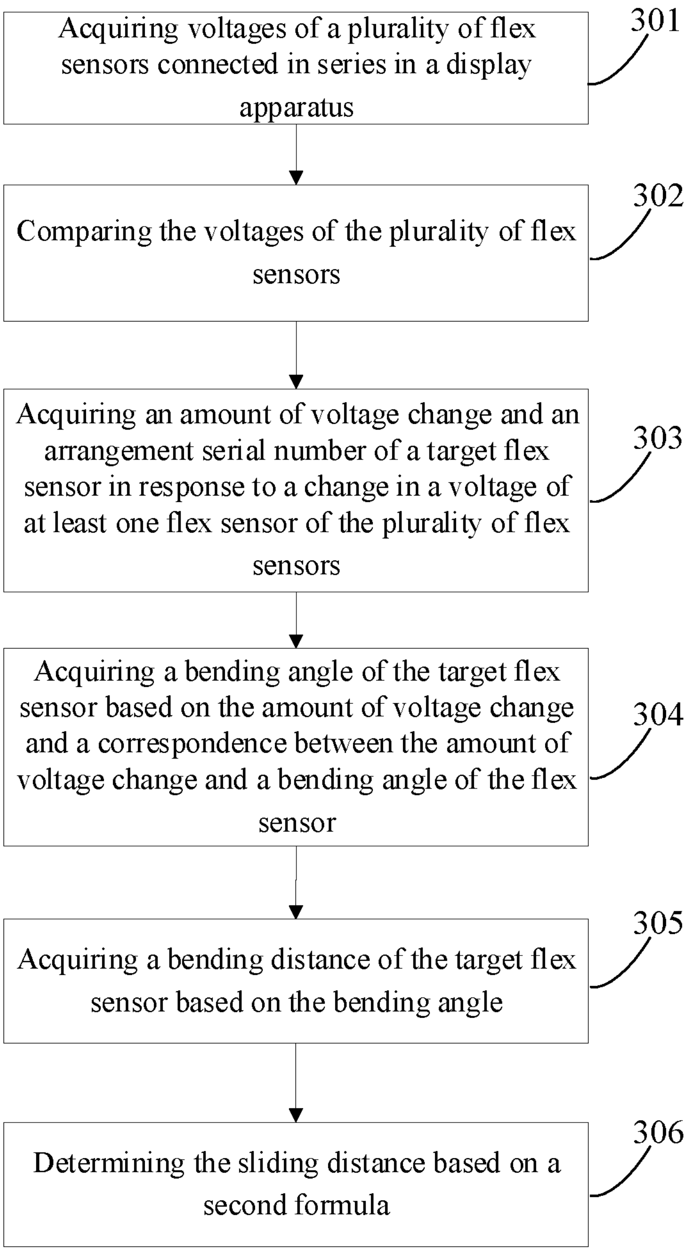
FIG. 9 is a flowchart of another method for controlling a display apparatus according to the embodiments of the present disclosure.

FIG. 9 is a flowchart of another method for controlling a display apparatus according to the embodiments of the present disclosure. The method is applicable to the display apparatus in any of the above embodiments. In some embodiments, the method includes the following processes.

In process 301, voltages of a plurality of flex sensors connected in series in the display apparatus are acquired.

The plurality of flex sensors have, along a direction away from the reel, a plurality of arrangement serial numbers from small to large in the state where the flexible display panel is contracted. As shown in FIG. 6, in some embodiments, the plurality of flex sensors R1, R2, R3, . . . and Rn have arrangement serial numbers of 1, 2, 3, . . . and n. In some embodiments, the detection assembly acquires the voltages of the flex sensors at predetermined time intervals. In some embodiments, the predetermined time is a time set by a user as desired, such as 0.5 s, 1 s, 2 s, or 3 s.

In some embodiments, the voltages of the plurality of flex sensors are acquired in real-time or according to a predetermined frequency. In some embodiments, the predetermined frequency is greater than a refresh frequency of the flexible display panel. In this way, it is ensured that the slidable and rollable display portion that passes through the reel and slides out of the fixed housing is refreshed on time and displays a picture. The phenomenon that the slidable and rollable display portion cannot display a screen upon the slidable and rollable display portion sliding out of the fixed housing and being flush with the flat display portion is avoided.

In process 302, the voltages of the plurality of flex sensors are compared.

In some embodiments, the control assembly pre-stores the voltages of the plurality of flex sensors in the unbending state, i.e., in the case of the bending angle being 0°, which are referred to as the average voltage V'. Upon the detection assembly acquiring the voltages of the plurality of flex sensors, the voltages of the plurality of flex sensors are compared with the average voltage V', and in the case that the difference between the voltage of the flex sensor and the average voltage V' is greater than a predetermined threshold value, it is considered that the voltage of the flex sensor is changed, i.e., the flex sensor is in a bending state. In some embodiments, the predetermined threshold value is five thousandths of the average voltage V'.

In process 303, in response to a change in the voltage of at least one flex sensor of the plurality of flex sensors, an amount of voltage change and an arrangement serial number of a target flex sensor are acquired.

Figure 10:
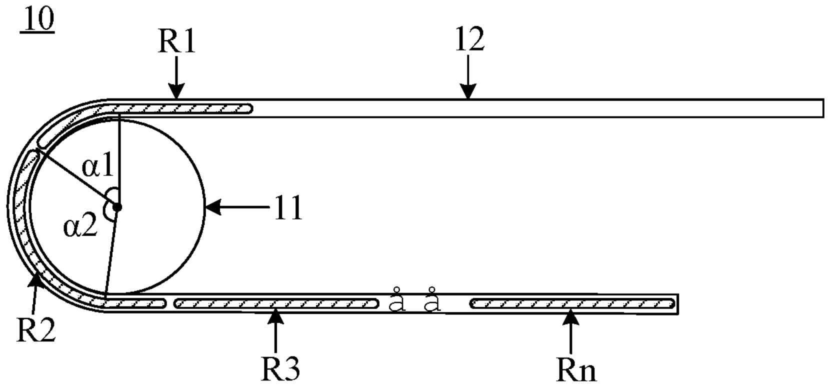
FIG. 10 is a structural schematic diagram of another display apparatus according to the embodiments of the present disclosure.

The target flex sensor is a flex sensor with a largest arrangement serial number among the at least one flex sensor. In the case that a plurality of flex sensors are located in a bending region of the flexible display panel, the flex sensor with the largest arrangement serial number is furthest away from a display surface of the flexible display panel, the display surface being a display surface capable of actually displaying a picture, and a sliding distance of the flexible display panel can be calculated with the flex sensor with the largest serial number, wherein the sliding distance is the distance by which the flexible display panel is driven by the reel to move. In some embodiments, FIG. 10 is a structural schematic diagram of another display apparatus according to the embodiments of the present disclosure, referring to FIG. 10, in the case that the flex sensor R1 of serial number 1 and the flex sensor R2 of serial number 2 are both in a bending region of the flexible display panel, the sliding distance of the flexible display panel is considered to be a sum of the length of the flex sensor R1 of serial number 1 and a bending distance of the flex sensor R2 of serial number 2. That is, a target point on the reel is used as a starting point, a portion of the flexible display panel that crosses the target point is considered as a sliding portion, and a length of the sliding portion in the winding direction is the sliding distance of the flexible display panel. In some embodiments, the target point is a point on the reel that is farthest away from the display surface of the display apparatus.

In process 304, a bending angle of the target flex sensor is acquired based on the amount of voltage change and the correspondence between the amount of voltage change and the bending angle of the flex sensor.

In some embodiments of the present disclosure, a database is established through practical testing, which includes a one-to-one correspondence between the voltage and the bending angle. During the use of the display apparatus, in the case that a voltage is detected by the detection assembly, a corresponding bending angle is directly acquired by searching the database, and then, the bending state and the bending position of the flexible display panel are determined based on the bending angle and the position of the flex sensor.

In some embodiments, the bending angle and the voltage of the flex sensor satisfy the following formula:

$$\alpha = LUT[(Vm - V')/V'];$$

wherein α represents the bending angle of the target flex sensor, LUT represents the correspondence, Vm represents the voltage of the target flex sensor, and V' represents the average voltage. $\eta=(Vm-V')/V'$, η represents the resistance change rate of the target flex sensor, and LUT refers to the display look-up table (English: Look-Up-Table).

In some embodiments, as shown in FIG. 10, the bending angles of the flex sensors R3 to Rn are 0°, so that the detection assembly derives from the detection that V2>V1>V3=V4= . . . =Vn. By using the above formulae, the bending angles α1 and α2 of the flex sensors R1 and R2 are calculated. In some embodiments, the bending angle α1 of the flex sensor R1 is 45° and the bending angle α2 of the flex sensor R2 is 135°.

In process 305, a bending distance of the target flex sensor is acquired based on the bending angle.

In some embodiments, the bending distance of the target flex sensor is acquired based on the bending angle and the radius of the reel, the bending distance of the target flex sensor being the length of the bent portion of the target flex sensor.

In some embodiments, the length of the flex sensor in the arrangement direction of the plurality of flex sensors is one-half of the circumference of the reel, such that the flex sensor satisfies the following formula:

$$L_1 = R \times \pi;$$

wherein $L_1$ represents the length of the flex sensor in the arrangement direction of the plurality of flex sensors, and R represents the radius of the reel.

The bending distance is determined based on a third formula: $L_0=(\alpha_m/180°)\times L_1$, wherein $\alpha_m$ represents the bending angle of the target flex sensor, $0° \leq \alpha_m \leq 180°$.

In an exemplary embodiment, as shown in FIG. 7, in the case that the bending angle of the target flex sensor is 180°, at this time, the sliding distance of the flexible display panel is $D=m\times R\times\pi$.

In process 306, the sliding distance is determined based on a second formula.

The second formula is: $D=(m-1)\times L_1+L_0$, wherein D represents the sliding distance, m represents the arrangement serial number of the target flex sensor, $L_1$ represents the length of the flex sensor in the arrangement direction of the plurality of flex sensors, and $L_0$ represents the bending distance of the target flex sensor. $(m-1)\times L_1$ represents that m−1 flex sensors completely cross the target point on the reel.

Figure 11:
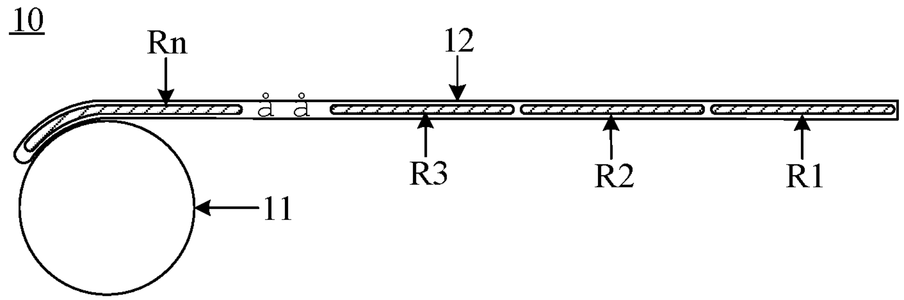
FIG. 11 is a structural schematic diagram of another display apparatus according to the embodiments of the present disclosure.

FIG. 11 is a structural schematic diagram of another display apparatus according to the embodiments of the present disclosure. Referring to FIG. 11, FIG. 11 illustrates a state in which the flexible display panel is slid to the endpoint, i.e., the flexible display panel is in an unfolding state. At this time, V1=V2= . . . =Vn−1<Vn, the bending angle of the flex sensor Vn is acquired based on the voltage of the flex sensor Vn, and the current bending angle of the flex sensor Vn is compared with the pre-stored bending angle of the flex sensor Vn in the case of the flexible display panel sliding to the endpoint. In the case that the above two bending angles are the same, it is determined that the flexible display panel slides to the endpoint.

Similarly, in some embodiments, during the process of folding the flexible display panel, the sliding distance of the flexible display panel is also calculated with reference to the above formula.

In summary, a method for controlling a display apparatus is provided in the embodiments of the present disclosure, the display apparatus including a reel, a flexible display panel, a detection assembly, and a plurality of flex sensors. The plurality of flex sensors are disposed on the flexible display panel and arranged along a winding direction of the flexible display panel. The flex sensors are configured to detect a change in the bending degree of the flexible display panel and output corresponding voltages according to the bending degree. In this way, an unfolding size or a contraction size of the flexible display panel in an unfolding process or a contraction process can be acquired by detecting bending states at multiple positions of the flexible display panel through the plurality of flex sensors, therefore the state of the flexible display panel is accurately detected, which can solve the problem of the poor accuracy of the state detection results of the flexible display panel in the related art, and achieve the effect of improving the accuracy of the state detection results of the flexible display panel.

According to another aspect of the present disclosure, a display device is provided. The display device includes a display apparatus, a processor, and a memory, the display apparatus being the above-described display apparatus, the memory storing at least one instruction, at least one program, a code set, or an instruction set, the at least one instruction, the at least one program, the code set, or the instruction set, when loaded and executed by the processor, causes the processor to perform the method for controlling the display apparatus as described above.

Figure 12:
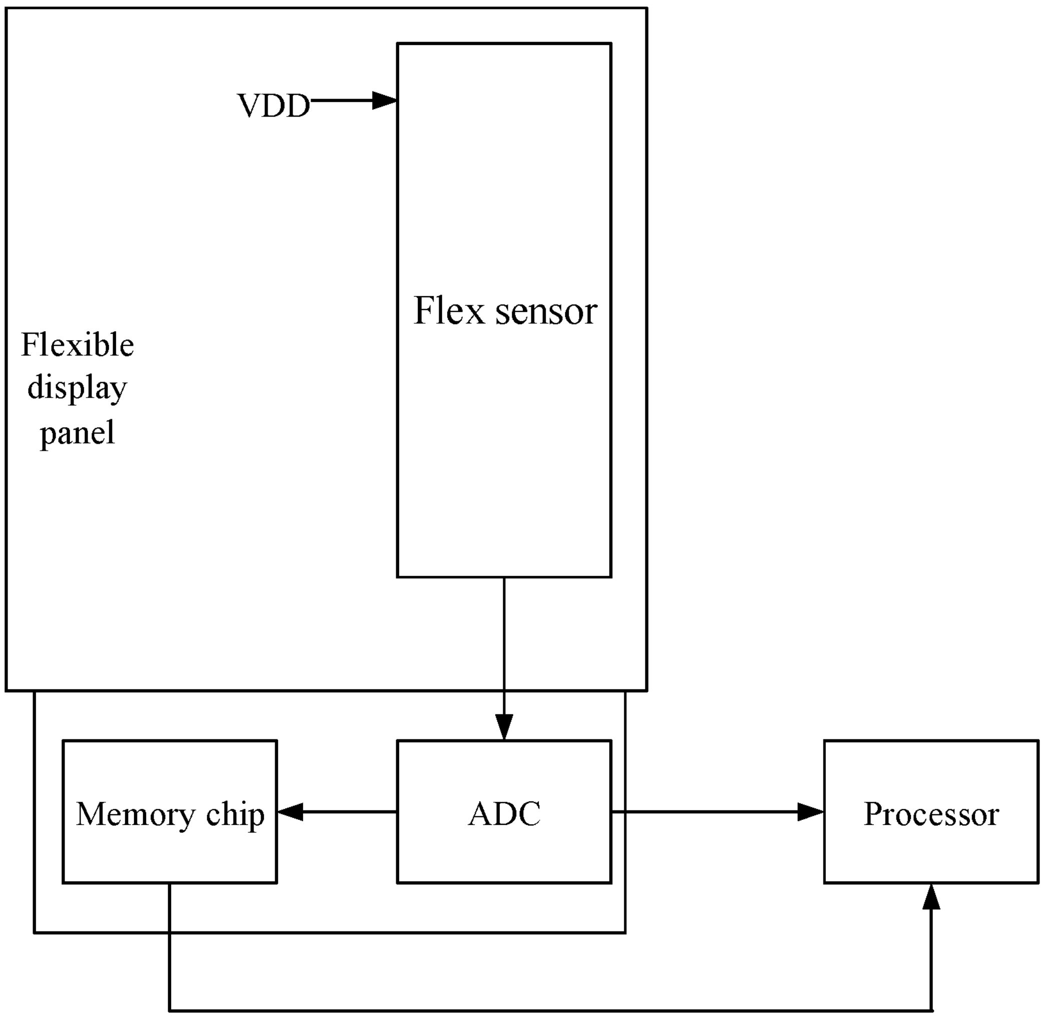
FIG. 12 is a structural schematic diagram of a display device according to the embodiments of the present disclosure.

As shown in FIG. 12, FIG. 12 is a structural schematic diagram of a display device according to the embodiments of the present disclosure. In some embodiments, one end of the plurality of flex sensors connected in series is electrically connected to a power line (VDD), such that the plurality of flex sensors connected in series are supplied with power via the power line, and another end of the plurality of flex sensors connected in series is grounded. The flex sensors have a resistance range of 1000 Ohms to 2000 Ohms, and the flex sensors have a power consumption of less than 1 milliwatt (mW).

In some embodiments, the detection assembly includes an analog-to-digital converter (ADC), and the detection assembly detects voltages of the plurality of flex sensors in series at the same time by acquiring differential voltages. The number of the traces between n flex sensors and the detection assembly is 2n.

In some embodiments, the display device is a dual slidable and rollable device, i.e., the flexible display panel includes two slidable and rollable display portions. In some embodiments, the size of the flexible display device in the unfolding state ranges from 15 inches to 20 inches, and the number of terminals on the detection assembly for connecting with the above-mentioned traces is from 10 to 20. In some embodiments, the memory chip is configured to store the correspondence between the bend angles of the flex sensors and the voltages of the flex sensors. In some embodiments, the memory chip is configured to calibrate the correspondence based on the environment temperature in which the display panel is used or the like. In some embodiments, the detection assembly sends the collected voltages corresponding to the flex sensors to the processor (SOC) via a data transmission protocol such as I2C or SPI, and the processor acquires the sliding and rolling state and sliding distance of the flexible display panel based on the voltages of the flex sensors and the above correspondence.

In addition, the embodiments of the present disclosure provide anon-transitory computer storage medium. The computer storage medium stores at least one instruction, at least one program, a code set, or an instruction set. The at least one instruction, the at least one program, the code set, or the instruction set, when loaded and executed by a processor, causes the processor to perform the method for controlling a display panel as described above.

In addition, the embodiments of the present disclosure provide a computer program product or computer program that includes at least one computer instruction stored in a computer-readable storage medium. The at least one computer instruction, when loaded from the computer-readable storage medium and executed by a processor of a computer device, causes the computer device to perform the above-described method for controlling the display panel.

In this disclosure, the terms "first," "second," "third." and "fourth" are used only for descriptive purposes and shall not be understood as indicating or implying relative importance. The term "plurality" refers to two or more, unless expressly limited otherwise.

In the several embodiments provided in this disclosure, it should be understood that the devices and methods disclosed may be achieved in other ways. For example, the above-described embodiments of the device are merely schematic, e.g., the division of the units described, is merely a logical functional division, and in actual implementation, there may be other division ways. In some embodiments, a plurality of units or components are combined or integrated into another system, or some features are ignored, or not performed. As another point, in some embodiments, the mutual coupling, direct coupling, or communication connection shown or discussed is achieved through some interface, and the indirect coupling or communication connection between apparatuses or units is electrical, mechanical, or otherwise.

The units illustrated as separated components may or may not be physically separated, and components shown as units may or may not be physical units, i.e., they may be located in a single place or they may be distributed to a plurality of network units. Some or all of these units may be selected to fulfill the purpose of the solution of the embodiments depending on actual needs.

A person of ordinary skill in the art can understand that all or some of the processes for achieving the above embodiments may be accomplished by hardware, or may be accomplished by a program that instructs the relevant hardware to accomplish the same, wherein the program may be stored in a computer-readable storage medium. The above-mentioned storage medium includes a read-only memory, a disk, a compact disc, or the like.

The foregoing is only optional embodiments of the present application, and is not intended to limit the present application, and any modifications, equivalent substitutions, improvements, etc. made within the concept and principles of the present application are included in the protection scope of the present application.

The invention claimed is:

1. A display apparatus, comprising: a reel, a flexible display panel, a detection assembly, a control assembly, and a plurality of flex sensors; wherein at least part of the flexible display panel is wound on the reel;

the plurality of flex sensors are connected in series and disposed on the flexible display panel, the plurality of flex sensors are arranged along a winding direction of the flexible display panel, and a resistance value of at least one flex sensor of the plurality flex sensors is positively correlated with a bending degree of the at least one flex sensor; and the detection assembly is electrically connected to the plurality of flex sensors respectively to detect voltages of the flex sensors;

the control assembly is configured to perform:

acquiring voltages of the plurality of flex sensors connected in series in the display apparatus, wherein the plurality of flex sensors have, along a direction away from the reel, a plurality of arrangement serial numbers from small to large in a state where a flexible display panel is contracted;

comparing the voltages of the plurality of flex sensors;

acquiring an amount of voltage change and an arrangement serial number of a target flex sensor in response to a change in a voltage of at least one flex sensor of the plurality of flex sensors, the target flex sensor being a flex sensor with a largest arrangement serial number among the at least one flex sensor; and determining a sliding distance of the flexible display panel based on the amount of voltage change and the arrangement serial number, the sliding distance being a distance by which a reel drives the flexible display panel to move;

wherein determining the sliding distance of the flexible display panel based on the amount of voltage change and the arrangement serial number comprises:

acquiring a bending angle of the target flex sensor based on the amount of voltage change and a correspondence between the amount of voltage change and a bending angle of at least one of the plurality of flex sensors;

acquiring a bending distance of the target flex sensor based on the bending angle; and determining the sliding distance based on a second formula:

$$D=(m-1)\times L_1+L_0;$$

wherein D represents the sliding distance, m represents an arrangement serial number of a target flex sensor, $L_1$ represents a length of the flex sensor in an arrangement direction of the plurality of flex sensors, and $L_0$ represents the bending distance of the target flex sensor;

wherein the length of the flex sensor in the arrangement direction of the plurality of flex sensors is one-half of a circumference of the reel; and acquiring the bending distance of the target flex sensor based on the bending angle comprises:

determining the bending distance based on a third formula:

$$L_0=(\alpha_m/180°)\times L_1;$$

wherein $\alpha_m$ represents the bending angle of the target flex sensor.

2. The display apparatus according to claim 1, further comprising: a fixed housing, a telescopic structure, a support member, and a tension member; wherein one end of the telescopic structure is fixedly connected to the fixed housing, another end of the telescopic structure is fixedly connected to the support member, and the support member is movably connected to the reel; and the flexible display panel comprises a flat display portion and a slidable and rollable display portion that are connected to each other, wherein one edge of the flat display portion is fixedly connected to one edge of the slidable and rollable display portion, the flat display portion is fixedly connected to the fixed housing, the slidable and rollable display portion is at least partially wound on the reel, another edge of the slidable and rollable display portion is fixedly connected to one end of the tension member, and another end of the tension member is fixedly connected to the fixed housing.

3. The display apparatus according to claim 2, wherein the plurality of flex sensors are disposed in the slidable and rollable display portion, and a number of the flex sensors and a first width of the slidable and rollable display portion satisfy a first formula:

$$n=S/L_1;$$

wherein n represents the number of the flex sensors, S represents the first width of the slidable and rollable display portion, the first width is a width of the slidable and rollable display portion in a direction perpendicular to a length direction of the reel in a state where the flexible display panel is contracted, and $L_1$ represents a length of the flex sensor in an arrangement direction of the plurality of flex sensors.

4. The display apparatus according to claim 1, wherein the plurality of flex sensors have a same structure, shape, and size.

5. The display apparatus according to claim 1, wherein the flex sensor comprises a metal pattern, and the flex sensor is in a shape of a strip or a winding line.

6. The display apparatus according to claim 5, wherein the flexible display panel comprises a gate line and a data line;

wherein the flex sensor is disposed in a same layer as the gate line, or the flex sensor is disposed in a same layer as the data line.

7. The display apparatus according to claim 1, further comprising: a drive assembly; wherein the control assembly is electrically connected to the detection assembly and the drive assembly respectively, and the drive assembly is configured to drive the reel to rotate; and the control assembly is configured to receive voltages of the plurality of flex sensors acquired by the detection assembly and control rotation or stopping of the reel by determining a sliding distance of the flexible display panel based on the voltages, the sliding distance being a distance by which the reel drives the flexible display panel to move.

8. A method for controlling a display apparatus, comprising:

acquiring voltages of a plurality of flex sensors connected in series in the display apparatus, wherein the plurality of flex sensors have, along a direction away from a reel, a plurality of arrangement serial numbers from small to large in a state where a flexible display panel is contracted;

comparing the voltages of the plurality of flex sensors;

acquiring an amount of voltage change and an arrangement serial number of a target flex sensor in response to a change in a voltage of at least one flex sensor of the plurality of flex sensors, the target flex sensor being a flex sensor with a largest arrangement serial number among the at least one flex sensor; and determining a sliding distance of the flexible display panel based on the amount of voltage change and the arrangement serial number, the sliding distance being a distance by which a reel drives the flexible display panel to move;

wherein determining the sliding distance of the flexible display panel based on the amount of voltage change and the arrangement serial number comprises:

acquiring a bending angle of the target flex sensor based on the amount of voltage change and a correspondence between the amount of voltage change and a bending angle of the flex sensor;

acquiring a bending distance of the target flex sensor based on the bending angle; and determining the sliding distance based on a second formula:

$$D=(m-1)\times L_1+L_0;$$

wherein D represents the sliding distance, m represents an arrangement serial number of a target flex sensor, $L_1$ represents a length of the flex sensor in an arrangement direction of the plurality of flex sensors, and $L_0$ represents the bending distance of the target flex sensor;

wherein the length of the flex sensor in the arrangement direction of the plurality of flex sensors is one-half of a circumference of the reel; and acquiring the bending distance of the target flex sensor based on the bending angle comprises:

determining the bending distance based on a third formula:

$$L_0=)(\alpha_m/180°\times L_1;$$

wherein $\alpha_m$ represents the bending angle of the target flex sensor.

9. The method according to claim 8, wherein the voltages of the plurality of flex sensors are acquired in real-time or according to a predetermined frequency.

10. The method according to claim 9, wherein the predetermined frequency is greater than a refresh frequency of the flexible display panel.

11. A non-transitory computer storage medium, storing at least one instruction, at least one program, a code set, or an instruction set; wherein the at least one instruction, the at least one program, the code set, or the instruction set, when loaded and executed by a processor, causes the processor to perform the method for controlling a display apparatus as defined in claim 8.

12. A display device, comprising: a display apparatus, a processor, and a memory; wherein the memory stores at least one instruction, at least one program, a code set, or an instruction set, wherein the at least one instruction, the at least one program, the code set, or the instruction set, when loaded and executed by the processor, causes the processor to perform:

acquiring voltages of a plurality of flex sensors connected in series in the display apparatus, wherein the plurality of flex sensors have, along a direction away from a reel, a plurality of arrangement serial numbers from small to large in a state where a flexible display panel is contracted;

comparing the voltages of the plurality of flex sensors;

acquiring an amount of voltage change and an arrangement serial number of a target flex sensor in response to a change in a voltage of at least one flex sensor of the plurality of flex sensors, the target flex sensor being a flex sensor with a largest arrangement serial number among the at least one flex sensor; and determining a sliding distance of the flexible display panel based on the amount of voltage change and the arrangement serial number, the sliding distance being a distance by which a reel drives the flexible display panel to move;

wherein determining the sliding distance of the flexible display panel based on the amount of voltage change and the arrangement serial number comprises:

acquiring a bending angle of the target flex sensor based on the amount of voltage change and a correspondence between the amount of voltage change and a bending angle of the flex sensor;

acquiring a bending distance of the target flex sensor based on the bending angle; and determining the sliding distance based on a second formula:

$$D=(m-1)\times L_1+L_0;$$

wherein D represents the sliding distance, m represents an arrangement serial number of a target flex sensor, $L_1$ represents a length of the flex sensor in an arrangement direction of the plurality of flex sensors, and $L_0$ represents the bending distance of the target flex sensor;

wherein the length of the flex sensor in the arrangement direction of the plurality of flex sensors is one-half of a circumference of the reel; and acquiring the bending distance of the target flex sensor based on the bending angle comprises:

determining the bending distance based on a third formula:

$$L_0=(\alpha_m/180°\times L_1;$$

wherein $\alpha_m$ represents the bending angle of the target flex sensor.

13. The display device according to claim 12, wherein the voltages of the plurality of flex sensors are acquired in real-time or according to a predetermined frequency.

14. The display device according to claim 13, wherein the predetermined frequency is greater than a refresh frequency of the flexible display panel.

* * * * *